United States Patent
Liu et al.

(10) Patent No.: US 12,339,136 B2
(45) Date of Patent: Jun. 24, 2025

(54) MULTI-VARIATE GYROSCOPE OFFSET TEMPERATURE COEFFICIENT COMPENSATION

(71) Applicant: InvenSense, Inc., San Jose, CA (US)

(72) Inventors: Zhongzheng Liu, Milipitas, CA (US); Jongwoo Shin, Pleasanton, CA (US); Ren Wang, San Jose, CA (US)

(73) Assignee: InvenSense, Inc., San Jose, CA (US)

( * ) Notice: Subject to any disclaimer, the term of this patent is extended or adjusted under 35 U.S.C. 154(b) by 302 days.

(21) Appl. No.: 18/126,337

(22) Filed: Mar. 24, 2023

(65) Prior Publication Data

US 2024/0318979 A1 Sep. 26, 2024

(51) Int. Cl.
*G01C 19/5776* (2012.01)
*G01C 19/5691* (2012.01)
*G01C 25/00* (2006.01)

(52) U.S. Cl.
CPC ....... *G01C 25/005* (2013.01); *G01C 19/5691* (2013.01); *G01C 19/5776* (2013.01)

(58) Field of Classification Search
CPC .............. G01C 25/005; G01C 19/5691; G01C 19/5776
See application file for complete search history.

(56) References Cited

U.S. PATENT DOCUMENTS

| | | | | |
|---|---|---|---|---|
| 2002/0165687 | A1* | 11/2002 | Goto | G01C 21/28 702/146 |
| 2005/0256659 | A1* | 11/2005 | Malvern | G01C 19/567 702/96 |
| 2012/0203487 | A1* | 8/2012 | Johnson | G01C 25/005 702/141 |
| 2021/0278212 | A1* | 9/2021 | Scafidi | G01K 13/00 |
| 2021/0348502 | A1* | 11/2021 | Xue | G01C 19/56 |

* cited by examiner

*Primary Examiner* — David J Bolduc
(74) *Attorney, Agent, or Firm* — DLA Piper LLP (US)

(57) ABSTRACT

A method for calibrating a micro-electro-mechanical system (MEMS) gyroscopes by determining a plurality of variates including quadrature and inphase values from output data of a first subset of the MEMS gyroscopes, determining offset temperature coefficients of the first subset of the MEMS gyroscopes over temperature variation, computing a linear regression using the quadrature and inphase values and the offset temperature coefficients to determine linear regression variate coefficients for predicting the offset temperature coefficient based on the quadrature and inphase values. The method also including determining a plurality of variates including quadrature and inphase values from output data of a second subset of the MEMS gyroscopes, determining a predicted offset temperature coefficient based on the quadrature and inphase values and the linear regression variate coefficients, and programing the second subset of the MEMS gyroscopes to use the predicted offset temperature coefficient to adjust the output data during operation.

20 Claims, 7 Drawing Sheets

MULTI-VARIATE GYROSCOPE OFFSET TEMPERATURE COEFFICIENT COMPENSATION

FIELD

A system and method for multi-variate gyroscope offset temperature coefficient compensation.

BACKGROUND

Micro-Electro-Mechanical System (MEMS) gyroscopes generally suffer from flaws in their manufactured physical dimensions (e.g. mass having incorrect dimensions). These flaws result in inaccuracies of angular velocity measured by the MEMS gyroscopes. Conventional solutions utilize an offset temperature coefficient (TC) that adjusts the gyroscope output data to correct for these inaccuracies. Conventional methods, however, are deficient for being able to accurately and efficiently determine an offset TC.

SUMMARY

An example embodiment includes a method for calibrating a micro-electro-mechanical system (MEMS) gyroscopes. The method including, during a characterization phase, a) controlling a first subset of the MEMS gyroscopes to vibrate masses of the first subset of the MEMS gyroscopes, b) determining a plurality of variates including quadrature and inphase values from output data of the first subset of the MEMS gyroscopes, c) determining offset temperature coefficients to minimize erroneous output data of the first subset of the MEMS gyroscopes over temperature variation, d) computing a linear regression using the quadrature and inphase values and the offset temperature coefficients determined for the first subset of the MEMS gyroscopes to determine linear regression variate coefficients for predicting the offset temperature coefficient based on the quadrature and inphase values. The method includes during a production factory trim phase e) controlling a second subset of the MEMS gyroscopes to vibrate masses of the second subset of the MEMS gyroscopes, f) determining a plurality of variates including quadrature and inphase values from output data of the second subset of the MEMS gyroscopes, g) determining a predicted offset temperature coefficient based on the quadrature and inphase values and the linear regression variate coefficients, and h) programing the second subset of the MEMS gyroscopes to use the predicted offset temperature coefficient to adjust the output data during operation.

An example embodiment includes a system for calibrating micro-electro-mechanical system (MEMS) gyroscopes. The system including a processor, and a chip testing interface. The processor is configured to, during a characterization phase, a) control a first subset of the MEMS gyroscopes to vibrate masses of the first subset of the MEMS gyroscopes, b) determine a plurality of variates including quadrature and inphase values from output data of the first subset of the MEMS gyroscopes, c) determine offset temperature coefficients to minimize erroneous output data of the first subset of the MEMS gyroscopes over temperature variation, d) compute a linear regression using the quadrature and inphase values and the offset temperature coefficients determined for the first subset of the MEMS gyroscopes to determine linear regression variate coefficients for predicting the offset temperature coefficient based on the quadrature and inphase values. The processor is configured to, during a production factory trim phase, a) control a second subset of the MEMS gyroscopes to vibrate masses of the second subset of the MEMS gyroscopes, f) determine a plurality of variates including quadrature and inphase values from output data of the second subset of the MEMS gyroscopes, g) determine a predicted offset temperature coefficient based on the quadrature and inphase values and the linear regression variate coefficients, and h) program the second subset of the MEMS gyroscopes to use the predicted offset temperature coefficient to adjust the output data during operation.

An example embodiment includes a calibrated micro-electro-mechanical system (MEMS) gyroscope, including a mass driven by an electrical drive signal to vibrate, a detection electrode for detecting inphase and quadrature movement of the mass, a memory device storing an offset temperature coefficient for minimizing erroneous output data of the MEMS gyroscope, where the offset temperature coefficient is predicted by applying linear regression variate coefficients determined from a linear regression to variates including quadrature and inphase values of the output data measured while a plurality of MEMS gyroscopes are driven and are maintained in a static position, and a circuit that uses the offset temperature coefficient to compensate for a bias in the output data of the MEMS gyroscope during operation.

An example embodiment includes a method for determining linear regression variate coefficients for determining an offset temperature coefficient for micro-electro-mechanical system (MEMS) gyroscopes. The method includes a) controlling a plurality of MEMS gyroscopes from a batch of MEMS gyroscopes to vibrate respective masses, b) determining a plurality of variates including quadrature and inphase values from an output data of each of the plurality of MEMS gyroscopes, c) determining offset temperature coefficients of each of the MEMS gyroscopes, d) computing a multi-variate linear regression using the quadrature and inphase values and the offset temperature coefficients determined for the MEMS gyroscopes to determine the linear regression variate coefficients for predicting the offset temperature coefficient based on the quadrature and inphase values, and e) programing all the MEMS gyroscopes in the batch to use a respective predicted offset temperature coefficient in order to adjust the output data of the MEMS gyroscopes during operation, the respective predicted offset temperature coefficient being determined by applying the linear regression variate coefficients from the linear regression to the respective variates of each of the MEMS gyroscopes.

BRIEF DESCRIPTION OF THE DRAWINGS

So that the manner in which the above recited features of the present disclosure can be understood in detail, a more particular description of the disclosure, briefly summarized above, may be had by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

DETAILED DESCRIPTION

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods and apparatus as known by one of ordinary skill in the relevant art may not be discussed in detail but are intended to be part of the specification where appropriate. In all the examples illustrated and discussed herein, any specific values should be interpreted to be illustrative and non-limiting. Thus, other example embodiments could have different values. Notice that similar reference numerals and letters refer to similar items in the following figures, and thus once an item is defined in one figure, it is possible that it need not be further discussed for the following figures. Below, the example embodiments will be described with reference to the accompanying figures.

MEMS gyroscopes are electronic sensors that measure angular velocity (e.g. rate of turn) by way of the Coriolis effect. The angular velocity measured by MEMS gyroscopes may be used by other devices (e.g. controller) within a larger system for determining angular velocity of an object about a given axis. For example, MEMS gyroscopes are deployed in many systems such as control-based applications including but not limited to control systems in the automotive, aeronautics and robotics industries.

Figure 1:
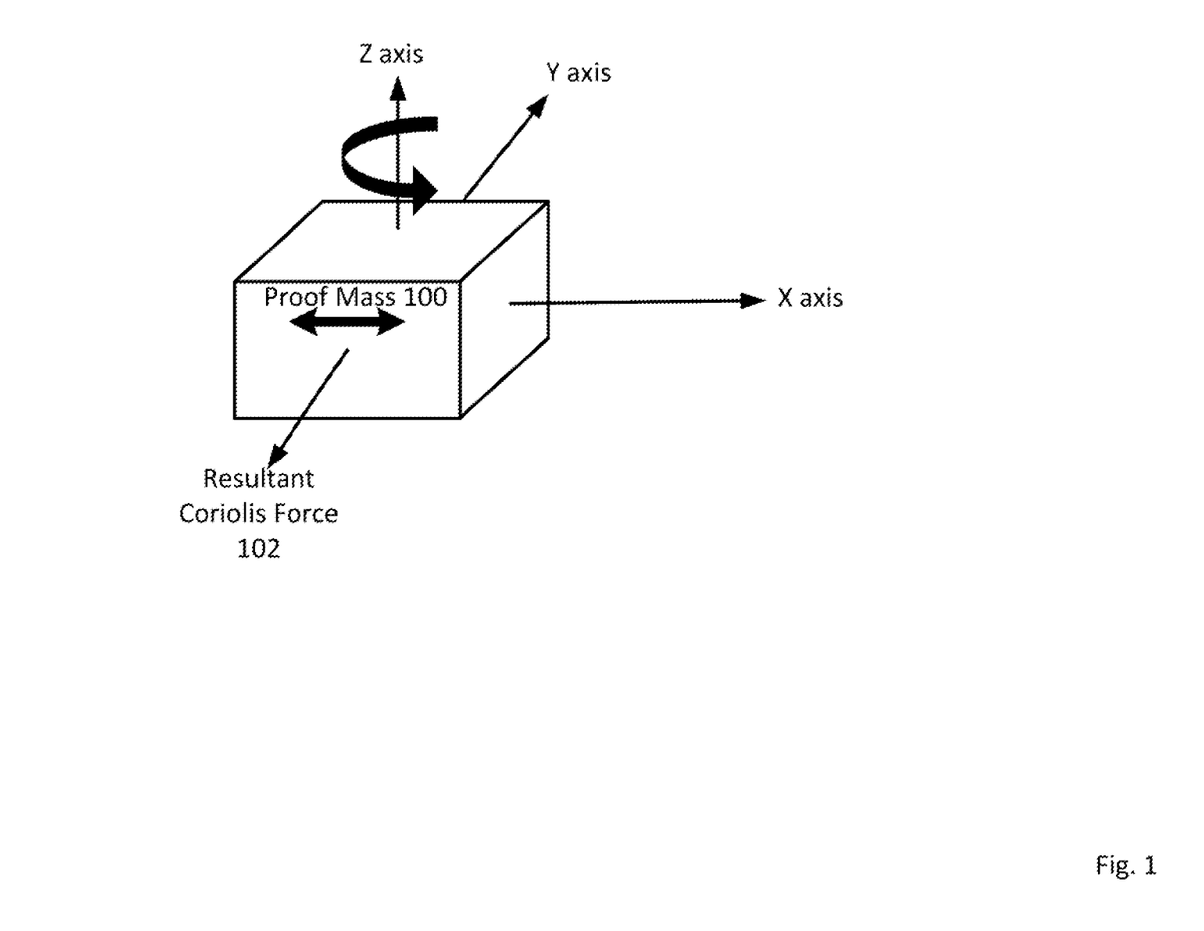
FIG. 1 shows an illustration of MEMS gyroscope theory, according to an example embodiment of the present disclosure.

A MEMS gyroscope generally includes a vibrating mass that when rotated by an external force, produces a resultant Coriolis force in proportion to the angular velocity of the rotation. For example, as shown in FIG. 1 a proof mass 100 of a MEMS gyroscope is driven to vibrate back and forth (left-to-right) along the X-axis in FIG. 1. If proof mass 100 is not being rotated, then the resultant Coriolis force 102 is zero. However, when an external force rotates proof mass 100 about the Z-axis, a resultant non-zero Coriolis force 102 is produced along the Y-axis (the mass deflects in the Y-axis). The direction of this resultant Coriolis force 102 is dependent on the direction of the rotation about the Z-axis. Likewise, the magnitude of this resultant Coriolis force 102 is dependent on the velocity of the rotation about the Z-axis. Although not shown in FIG. 1, the MEMS gyroscope includes sensors (e.g. capacitive sensors) to detect the position of the vibrating mass which is used to determine direction and magnitude of the resultant Coriolis force 102, and then translated into a gyroscope output data (e.g. a digital offset value representing angular velocity in a certain direction) for further processing by a control system. For example, when used by a vehicle control system, the angular velocity may be used to determine in which direction and how fast the vehicle is turning, which may then be used by the vehicle control system to control the vehicle or provide driver feedback (e.g. autonomously applying braking, steering or other corrections, alerting the driver as to warnings, etc.) to ensure proper performance and/or safety. Although not shown, when three or more MEMS gyroscopes are combined in one control system (e.g. a MEMS gyroscope for each axis in three-dimensional space), the angular velocity of an object in three-dimensional space can be monitored.

Figure 2:
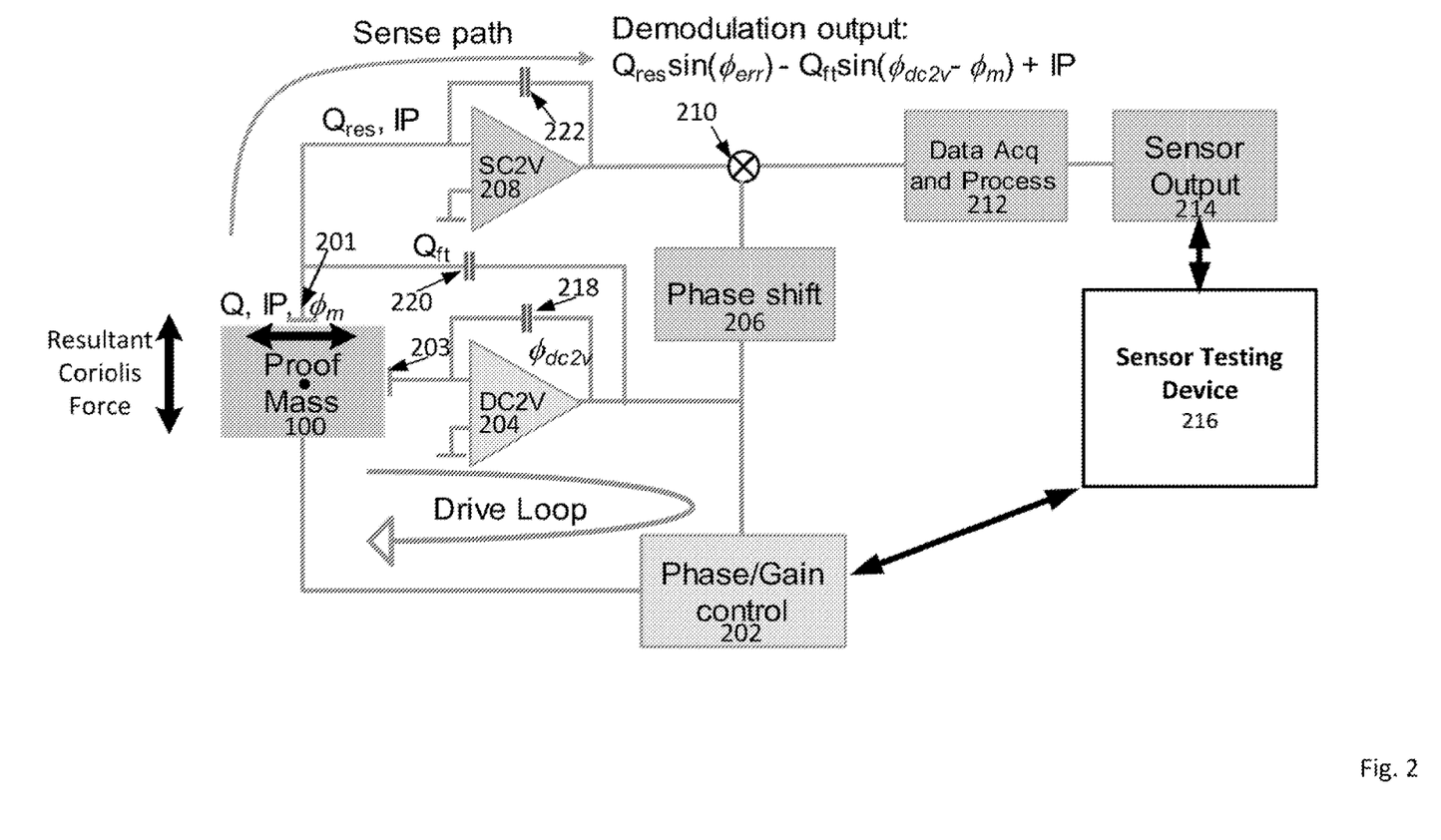
FIG. 2 shows a block diagram of a MEMS gyroscope, according to an example embodiment of the present disclosure.

In order to determine angular velocity, MEMS gyroscopes perform various operations/calculations on the sensed position of the vibrating mass. FIG. 2 shows a block diagram of a MEMS gyroscope describing the various operations/calculations performed on the sensed position of the vibrating mass, according to an example embodiment of the present disclosure. As shown in the block diagram, two primary components of the MEMS gyroscope are the drive loop control circuit for driving the vibrating mass and a sense path control circuit for sensing the angular velocity of the vibrating mass. Although not shown in detail, vibrating mass 100 in FIG. 2 is a mass within the sensor that is suspended in a resting initial position by springs. The suspended mass may be made of silicon, piezoelectric material or connected to piezoelectric material which vibrates (left-to-right in FIG. 2) in response to an electric drive signal applied through the drive loop. When no external rotational force about the center of the vibrating mass (see the black dot) is applied, proof mass 100 does not deflect in the Coriolis force direction (up-and-down in FIG. 2) and therefore no angular velocity is detected along the sense path. However, when an external rotational force about the center of the mass (see the black dot) is applied, proof mass 100 deflects in the Coriolis force direction (up-and-down in FIG. 2) and therefore an angular velocity is detected along the sense path.

More specifically, phase/gain control device 202 generates and applies a periodic drive signal to vibrate proof mass 100 left-to-right in FIG. 2. The drive loop employs a capacitive sensing plate 203 coupled to a feedback device such as a drive capacitance to voltage (DC2V) conversion device 204 utilizing capacitor 218 to convert the vibration of proof mass 100 to a voltage signal including DC2V Phase ($\phi_{dc2v}$) (DC2V phase delay) for feedback to both phase/gain control device 202 and phase shift device 206. During operation, when a rotational force is applied to proof mass 100, a resultant Coriolis force deflects proof mass 100 towards the capacitive sensing plate 201 of the sense path thereby producing a sensed signal. Although the sensed signal includes information about the Coriolis force (desired signal), the sensed signal also includes information about the Quadrature (Q) (the undesired signal out of phase with desired signal), Inphase Offset (IP) (the undesired signal in phase with desired signal), and MEMS Phase ($\phi_m$) (mechanical phase delay). A feedback loop including capacitor 220 feeds back a signal from the drive loop known as Feedthrough Quadrature ($Q_{ft}$) (the signal from Drive C2V) to compensate the Quadrature (Q). This results in a signal including Residual Quadrature ($Q_{res}$) (the Quadrature compensated by Feedthrough Quadrature $Q_{res}=Q-Q_{ft}$) along with IP being fed to sense capacitance to voltage (SC2V) device 208 and capacitor 222 which convert the vibration of the proof mass 100 to a voltage for output to demodulator 210. Demodulator 210 mixes the output of SC2V 208 (e.g. the sensed signal) with the output of phase shift 206 (e.g. phase shifted drive signal) to produce a demodulation output signal that is a difference between the Residual Quadrature ($Q_{res}$) and the Feedthrough Quadrature ($Q_{ft}$) plus the Inphase Offset (IP). The amplitude of the demodulation output signal is affected by Demodulation phase error ($\phi_{err}$) (the difference between trimmed phase and actual phase from components) and MEMS Phase ($\phi_m$) (mechanical phase delay). Output of the demodulator is then processed by data acquisition and processing device 212 which may convert/process the demodulation output signal in a particular format (e.g. digital data) for output by sensor output 214, where the sensor output may be utilized by an external device (e.g. controller) not shown. The output of the gyroscope is referred to as offset data.

Prior to being deployed in a device, however, the MEMS gyroscope is tested to determine a compensation value for minimizing bias in the offset data. In general, during testing, sensor testing device 216 (or a less complex testing device) powers the MEMS gyroscope phase gain control 202 to vibrate the proof mass 100 while the MEMS gyroscope is in a stationary position on the testing/assembly line, such that measurements described below may be captured and processed. The test procedure is performed at both a component level (i.e. chip level) and a board (e.g. surface mount technology (SMT) board) level for a subset of the MEMS gyroscopes in a batch during what is referred to herein as a "characterization phase".

In a first step of the "characterization phase", the manufacturer performs component level testing by randomly selecting a subset of the batch of MEMS gyroscopes and connecting the chips to a sensor testing device (e.g. device 216 or a less complex testing device) to determine variates (e.g. quadrature values, inphase values, various signal phase values involved in demodulation, etc.) at ambient temperature on the component level. In a second step of the characterization phase, the manufacturer performs SMT board level testing by installing the same subset of the MEMS gyroscopes on respective SMT boards and connecting these SMT boards to a testing device 216 to determine at least one variate (e.g. Residual Quadrature) at ambient temperature. During this second step, the manufacturer also heats the SMT boards in an oven to determine an offset TC over a temperature variation at two or more operating temperatures at SMT the board level. The variates determined at ambient temperature at both the component level and SMT board level, along with the offset TC values determined at the SMT board level are then used in a linear regression to determine linear regression variate coefficients for predicting offset TC based on the ambient variates.

After the characterization phase is complete, the manufacturer programs the remaining MEMS gyroscopes in the batch, each with a respective Offset TC during what is referred to herein as a "production factory trim phase". More specifically, the manufacturer is able to quickly and easily test another subset of the MEMS gyroscopes (e.g. the remaining MEMS gyroscopes in the batch) and determine appropriate offset TCs for the gyroscopes without heating the chips. Similar to the characterization phase, the testing executed during the production factory trim phase is performed at the component level. However, the gyroscopes do not need to be heated, as the variates measured at ambient temperature may be input to the previously computed linear regression equation to predict an appropriate Offset TC. For example, the manufacturer performs component level testing by connecting the remaining MEMS gyroscopes to a sensor testing device (e.g. device 216 or a less complex testing device) to determine variates (e.g. quadrature values, inphase values, various signal phase values involved in demodulation, etc.) at ambient temperature on the component level. The manufacturer then performs SMT board level testing by installing the subset of the MEMS gyroscopes on respective SMT boards and connecting these SMT boards to a testing device 216 to determine at least one variate (e.g. Residual Quadrature) at ambient temperature.

Specifically, during the characterization phase, while proof mass 100 is driven at ambient temperature, the data output by the MEMS gyroscope is monitored both at the component level and SMT board level to determine variates of interest. These variates include but are not limited to quadrature data, inphase data, phase error data, various signal phase values involved in demodulation and residual quadrature. Since the gyroscope is in a stationary position during these tests, there should be no detected Coriolis force. In other words, the digital gyroscope output should be neutral (e.g. no offset should be detected). However, due to manufacturing imperfections (e.g. asymmetric features) in the physical dimensions of the mass and/or sensing components, biased data (an erroneous offset) will be output by the MEMS gyroscope. Moreover, the MEMS gyroscope produces an unwanted bias in the digital gyroscope output that varies with operating temperature. Once the unwanted bias is detected during SMT board level testing at varying operating temperatures, sensor testing device 216 (or a less complex testing device) determines what is referred to in the industry as a temperature compensation coefficient (TC), also known as an offset TC, which is a slope of offset shift in the gyroscope output data over temperature. Offset TC is used during operation of the gyroscope to shift the gyroscope output data and minimize (e.g. cancel out) the bias in the output data over temperature variation. For example, a temperature dependent offset shift value from the TC is added to or subtracted to/from the gyroscope output data to minimize any bias shift over temperature. As mentioned above, the offset TC is determined based on a slope of the detected bias of the digital gyroscope output measured at two or more operating temperatures during the characterization phase of the test as the gyroscope is heated at the SMT board level by the oven under temperature control of the test device. In other words, once the offset TC is determined, an offset shift value for any given operating temperature along the slope is known and utilized to shift the gyroscope output data and minimize the gyroscope bias during operation.

Figure 3:
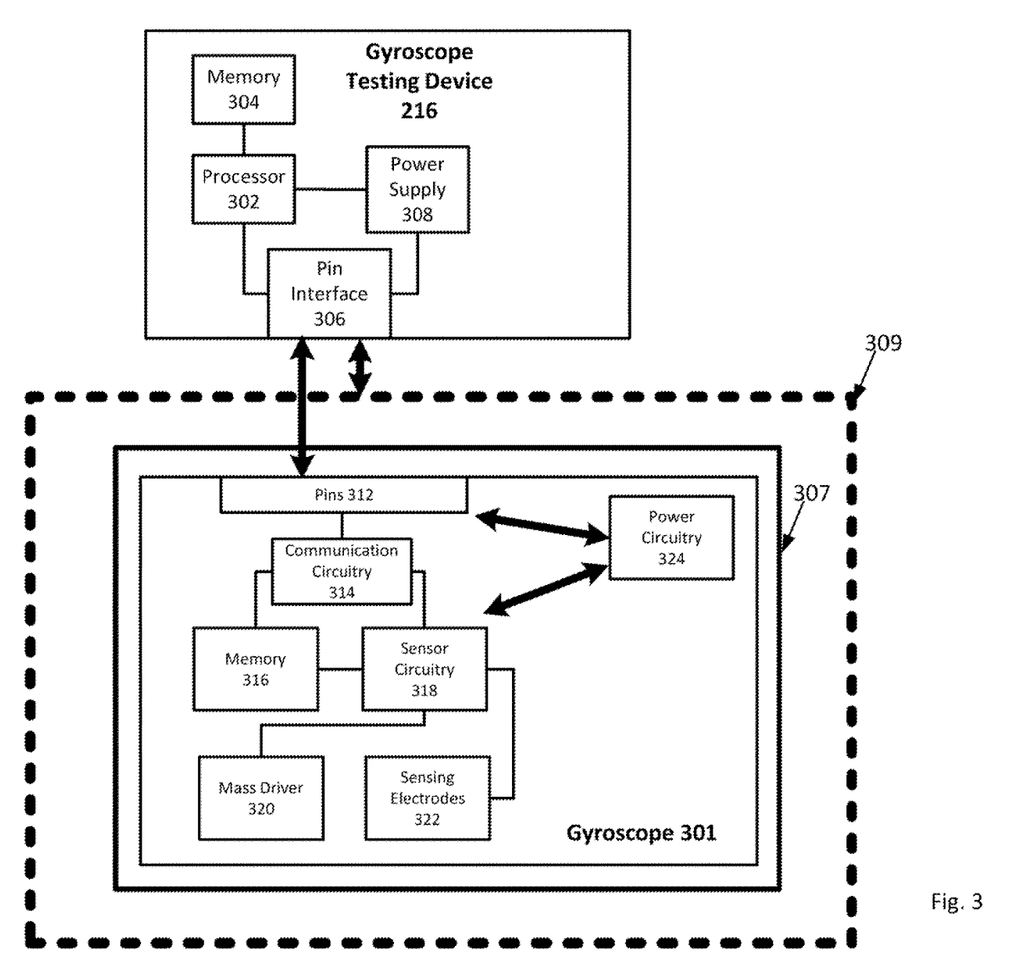
FIG. 3 shows a block diagram of a MEMS gyroscope coupled to a testing device, according to an example embodiment of the present disclosure.

Additional hardware details of testing device 216 and the MEMS gyroscope are shown FIG. 3. Specifically, testing device 216 has pin interface 306 (e.g. a specific configuration of pins/probes that correspond to the configuration of the gyroscope pins) that are temporarily electrically connected to pins 312 of MEMS gyroscope 201. Although not shown, testing device 216 may simultaneously connect to many MEMS gyroscopes for simultaneously testing a predetermined number of MEMS gyroscopes in a manufactured batch. Testing device 216 may include processor 302, memory 304, power supply 308 for facilitating the testing and oven 309 for optionally heating the MEMS gyroscopes which may be mounted to SMT board 307 for SMT board level testing. It is noted that SMT board 307 may include other electronic components mounted thereon that are electrically connected to and interact with gyroscope 301 to produce a desired functionality. Processor 302 may control the power supply 308 to power the pins 312 of the gyroscope to drive the proof mass to vibrate during both component level testing and SMT board level testing and receive the resultant output (e.g. detected angular velocity) from the gyroscope via pins interface 306. Processor 302 may also control the temperature of oven 309 via electrical connections through pin interface 306. Among others, MEMS gyroscope 301 may include communication circuitry 314, memory 316, sensor circuitry 318, proof mass driver 320, sensing electrodes 322, and power circuitry 324 for distributing the received power to the various components within the gyroscope. During testing, gyroscope testing device 216 may apply power to pins 312 of MEMS gyroscope 301 and to the control circuit (not shown) of oven 309. Upon receiving the power, power circuitry 324 may distribute the power to the various components within the gyroscope. Upon being powered, the communication circuitry may also facilitate communication between the sensor circuitry 318 and the testing device. Specifically, sensor circuitry 318 may use mass driver 320 to vibrate the proof mass and use sensing electrodes 322 to detect the drive loop and sense path behavior of the proof mass as described in FIG. 2. Data from the MEMS sensor (e.g. resultant sensor output data indicating the detected angular velocity) may then be sent back to test device 216 via pins 312. Upon receiving the sensor data via pin interface 306, processor 302 (using memory 304) determines an appropriate offset TC to minimize the inherent bias in MEMS gyroscope 301 output data. As mentioned above, testing may be performed on a component level (i.e. chip level) prior to gyroscope 301 being mounted on SMT board 307. Testing may also be performed at the SMT board level after gyroscope 301 is mounted on SMT board 307. In other words, gyroscope testing device 216 can perform component level testing and SMT board level testing either with or without the use of oven 309.

As described with respect to later figures, the offset TC and other variates (e.g. quadrature data, inphase data and phase error data) determined during the characterization phase serve the basis for data used in linear regression techniques to determine linear regression best fit variate coefficients that result in the prediction of a predicted offset TC correlated with the variates (e.g. an offset TC correlated to specific instances of quadrature data, inphase data, residual quadrature, phase error data values and various signal phase values involved in demodulation). In other words, once the linear regression is complete in the characterization phase, other (e.g. remaining) MEMS gyroscopes in the batch do not have to be heated during testing to determine offset TC. Rather, during the production factory trim phase at final test, the testing device simply measures the variates (e.g. an offset TC correlated to specific instances of quadrature data, inphase data, residual quadrature, phase error data values and various signal phase values involved in demodulation) of these remaining MEMS gyroscopes at the component level while at ambient temperature and applies the linear regression variate coefficients to the variates to predict the predicted offset TC. The predicted offset TC is then sent via pin interface 306 to MEMS gyroscope 301 where it is stored in memory 316 for future use. Particularly, when the MEMS gyroscope 301 is deployed into the field (e.g. installed in an embedded system), MEMS gyroscope 301 uses the stored offset TC in memory during the final test to adjust/calibrate its output data to reduce or eliminate any inherent bias in the gyroscope output over temperature variation, thereby resulting in more accurate angular velocity measurements provided to the system (e.g. control system).

Figure 4:
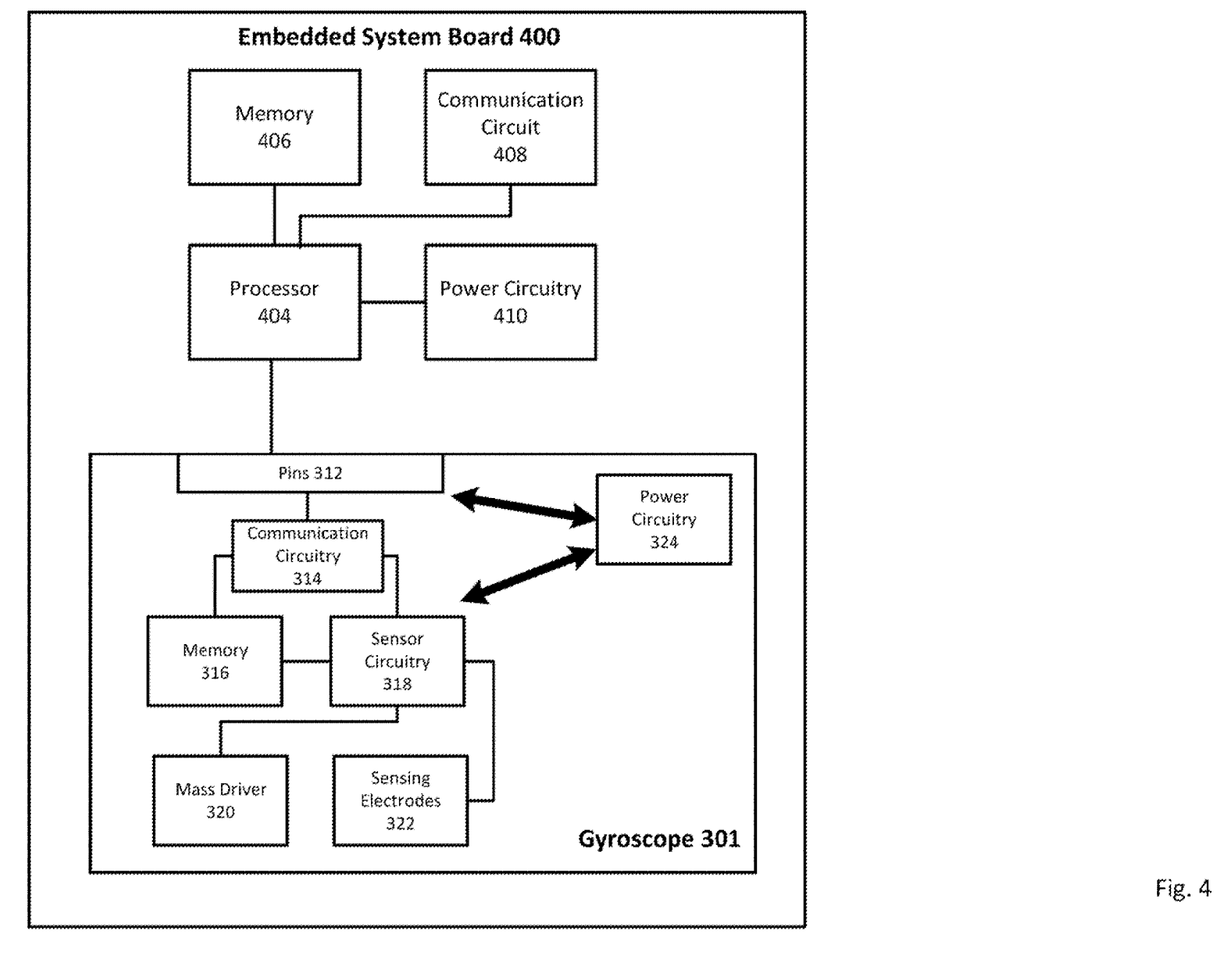
FIG. 4 shows a block diagram of an embedded system utilizing a MEMS gyroscope, according to an example embodiment of the present disclosure.

After testing and trimming with the offset TC at the production factory trim phase of the final test, MEMS gyroscope 301 may be deployed in the field into a larger system such as the embedded system shown in FIG. 4. This embedded system may include MEMS gyroscope 301 and other system (e.g. control system) circuitry such as processor 404, memory 406, communication circuitry 408 and power circuitry 410 on a common board. Embedded system board 400 may be deployed in the field as part of a system (e.g. control system) in automotive, aeronautics, robotics systems and the like. For example, when implemented in a vehicle, processor 404 may use MEMS gyroscope 301 to determine yaw rate of a vehicle. Processor 404 may equate the output of MEMS gyroscope 301 to yaw rate of the vehicle and as a result, control vehicle dynamics (e.g. braking, steering, acceleration, etc.) based on the yaw rate to enhance vehicle performance and/or safety (e.g. avoid over/ under steering, etc.).

As described above component level and SMT board level testing (testing at manufacturing) is beneficial for determining an appropriate offset TC for use by the MEMS gyroscope to minimize erroneous angular velocity output. Conventional systems determine an appropriate offset TC by using additional hardware such as an oven or on-chip heater to heat each and every chip and measure chip behavior of each and every chip with respect to operating temperature. However, this conventional technique requires the use of additional hardware (oven or on-chip-heater) for testing every single chip and is therefore slower and more expensive to implement. The determination of an appropriate offset TC, in one example of this disclosure, avoids the pitfalls of the conventional methods describe above, by limiting the use of the additional hardware (oven) to a small subset of the chips in the batch, and then employing linear regression (e.g. multi-variate linear regression) techniques that determine multi-variate linear regression best fit variate coefficients that correlate the variates to the predicted offset TC. The result is that all remaining chips in the batch can be component level tested simply by measuring the gyroscope output data (e.g. an offset TC correlated to specific instances of quadrature data, inphase data, residual quadrature, phase error data values and various signal phase values involved in demodulation) at ambient temperature (without the need for heating the chip) and selecting the appropriate offset TC by applying the linear regression variate coefficients to the measured ambient variates. Details of determining an appropriate offset TC are now described with respect to FIGS. 5-7. The characterization phase and production factory trim phase will now be described in more detail.

Figure 5:
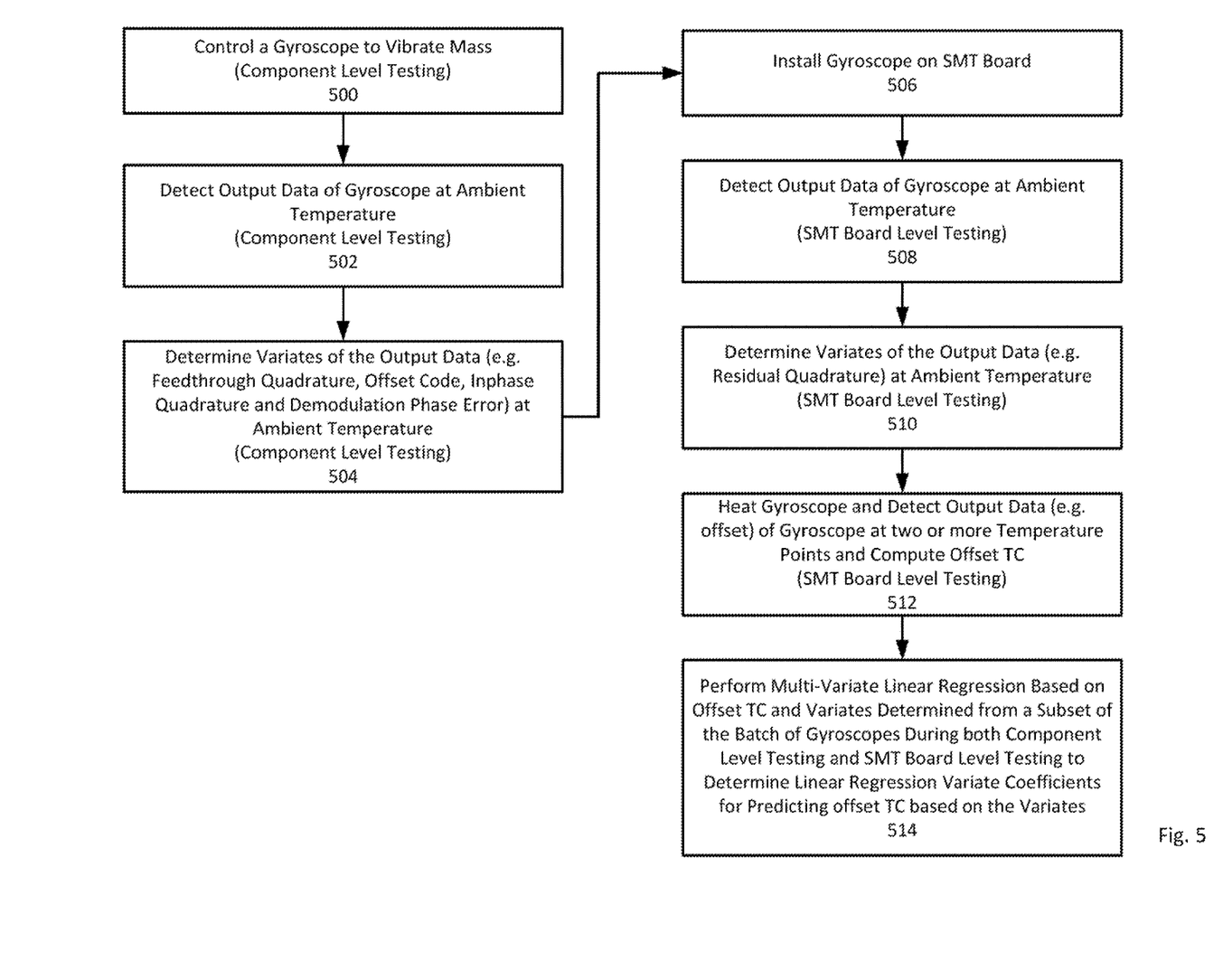
FIG. 5 shows a flowchart for the characterization phase of chip level and board level testing of a MEMS gyroscope, according to an example embodiment of the present disclosure.

FIG. 5 shows a flowchart for a characterization phase testing of a MEMS gyroscopes (component and SMT board level testing a subset of chips from the batch to determine linear regression variate coefficients). Component (i.e. chip) level testing is performed in steps 500- 504. Specifically, in step 500, testing device 216 controls MEMS gyroscope 301 (and other gyroscopes in the subset) to vibrate proof mass 100. Then, in steps 502 and 504, testing device 216 detects (at ambient temperature) the output data of MEMS gyroscope 301 and determines values of interest from output data of MEMS gyroscope 301. These values of interest are variates that include but are not limited to one or more of Feedthrough Quadrature ($Q_{ft}$), Inphase Offset (IP) and Demodulation phase error ($\phi_{err}$) which may be determined from the output data of MEMS gyroscope 301. Then, in step 506, component level tested gyroscopes are mounted to boards (e.g. SMT boards) for supporting SMT board level testing in steps 508-514. In step 508, testing device 216 controls MEMS gyroscope 301 (and other gyroscopes in the subset) to vibrate proof mass 100 and then detect the output data of MEMS gyroscope 301. In step 510, testing device 216 determines values of interest from MEMS gyroscope 301. These values of interest may include Residual Quadrature ($Q_{res}$). In step 512, the testing device 216 then heats MEMS gyroscope 301 mounted to the SMT board and detects the output data (e.g. offset bias) at two or more operating temperature points to compute an offset TC that compensates for the bias in the output data of the gyroscopes. The variates and the offset TC are correlated, and therefore have a relationship that can be determined via multi-variate linear regression techniques. Steps 500-512 are performed for each of the MEMS gyroscopes in the subset of a manufactured batch of gyroscopes and the resultant data from each of the MEMS gyroscopes are combined in a manner to produce a dataset that is applicable to multi-variate linear regression techniques. The size of the subset may be determined based on statistical methods for determining an appropriate sample size based on various factors including estimated/known similarities/differences between behavior of the chips, acceptable margin of error, etc. When the data is collected from the subset of gyroscopes, a linear regression is computed in step 514, where the variates may be equated to the predicted TC as shown in equation (1) below where the variates individually contribute to the equation and have their own coefficient (i.e. variate coefficient) which are computed:

$$\text{Multi-Var Trim: Offset\_TCpredicted} = k_1 Q_{res@SMT} + k_2 \phi_{err@FT} + k_3 Q_{fl@FT}(-\phi_{@FT}) + k_4 \text{Off}_{inphase@FT} + \text{intercept} \quad (1)$$

It is noted that in equation (1), the variates are maintained separately with separate coefficients. In another example, however, the variates could be combined into a single variate with a single coefficient in an attempt to simplify the equation.

Figure 6:
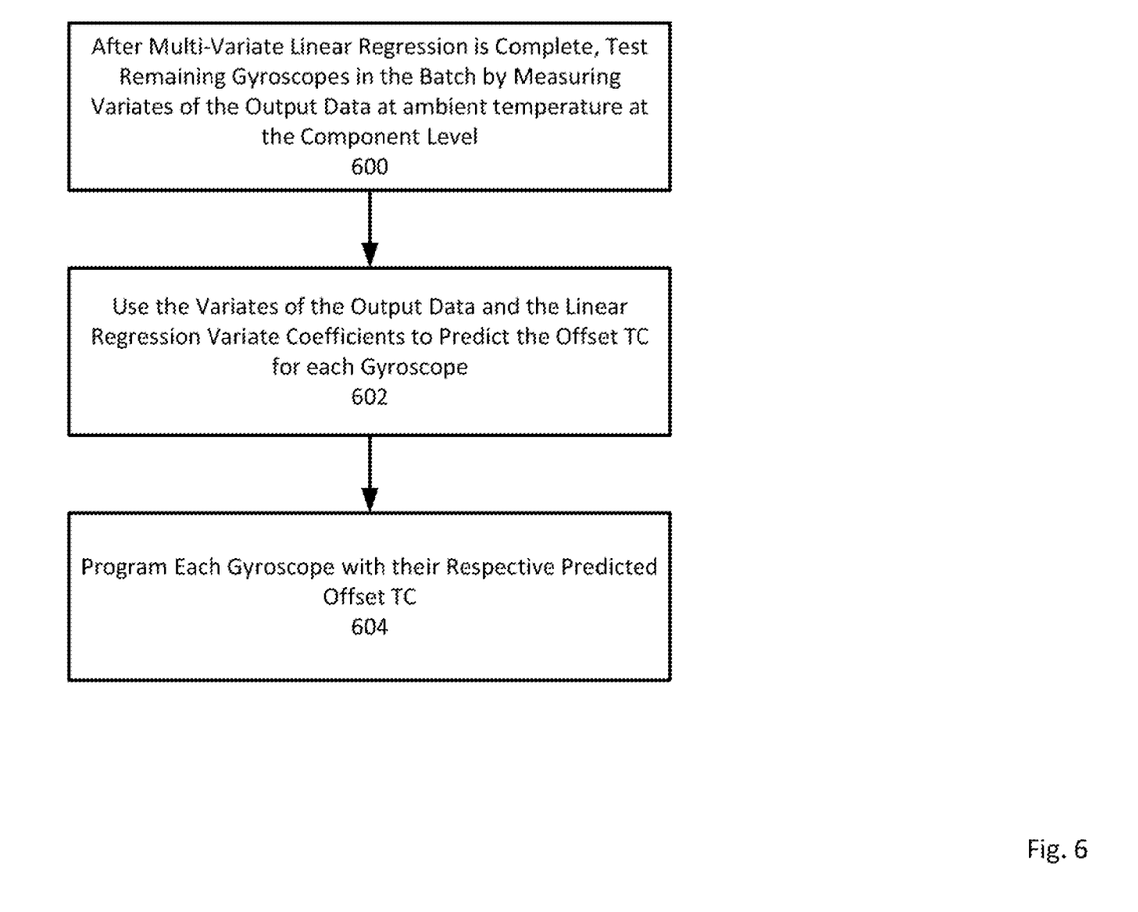
FIG. 6 shows a flowchart for the production factory trim phase of chip level testing of a MEMS gyroscope, according to an example embodiment of the present disclosure.

In either case, once the characterization phase is complete, the factory trim phase may be executed for other MEMS gyroscopes. FIG. 6 shows a flowchart for the factory trim phase of chip level testing of a MEMS gyroscope, where another subset of the chips (e.g. the remaining chips) from the batch are tested at ambient temperature at the component level to determine the variates, and where the linear regression variate coefficients are applied to the determined variates to predict an offset TC) without the need to heat the gyroscopes in the oven.

For example, after the linear regression is complete (e.g. after linear regression best fit variate coefficients are computed), testing of other gyroscopes (referred to in the industry as final test) does not require the use of the oven to determine offset TC. Rather, as described in step 600, the component level testing (similar to steps 500-504) of the other (e.g. remaining) gyroscopes in the batch is performed by testing device 216 (or a less complex testing device that does not include use of an oven) controlling MEMS gyroscope 301 to vibrate proof mass 100 and detecting (at ambient temperature) the output data variates of the MEMS gyroscope. These may include determining variates such as Feedthrough Quadrature ($Q_{fl}$), Inphase Offset (IP) and Demodulation phase error ($\phi_{err}$) at the component level. In step 602, these detected variates can be input to the linear regression equation determined during the characterization phase to predict a predicted offset TC which is then programmed in step 604 into the gyroscope memory during final test for later use during field operation. In one example, the variates (e.g. Feedthrough Quadrature ($Q_{fl}$), Inphase Offset (IP) and Demodulation phase error ($\phi_{err}$)) may be input to the linear regression equation. Specifically, during component level testing the variates may be input to the linear regression equation to determine an Offset TC.

The testing process described above limits the use of the oven for a small subset of sensors in the batch in the characterization phase to compute the linear regression best fit coefficients, whereas all remaining gyroscopes in the batch are more easily and quickly tested during the production factory trim phase at ambient temperature (i.e. without the need for an oven) to determine a predicted offset TC from the linear regression. This process results in a more efficient testing and programming process for the gyroscopes in the batch.

Figure 7:
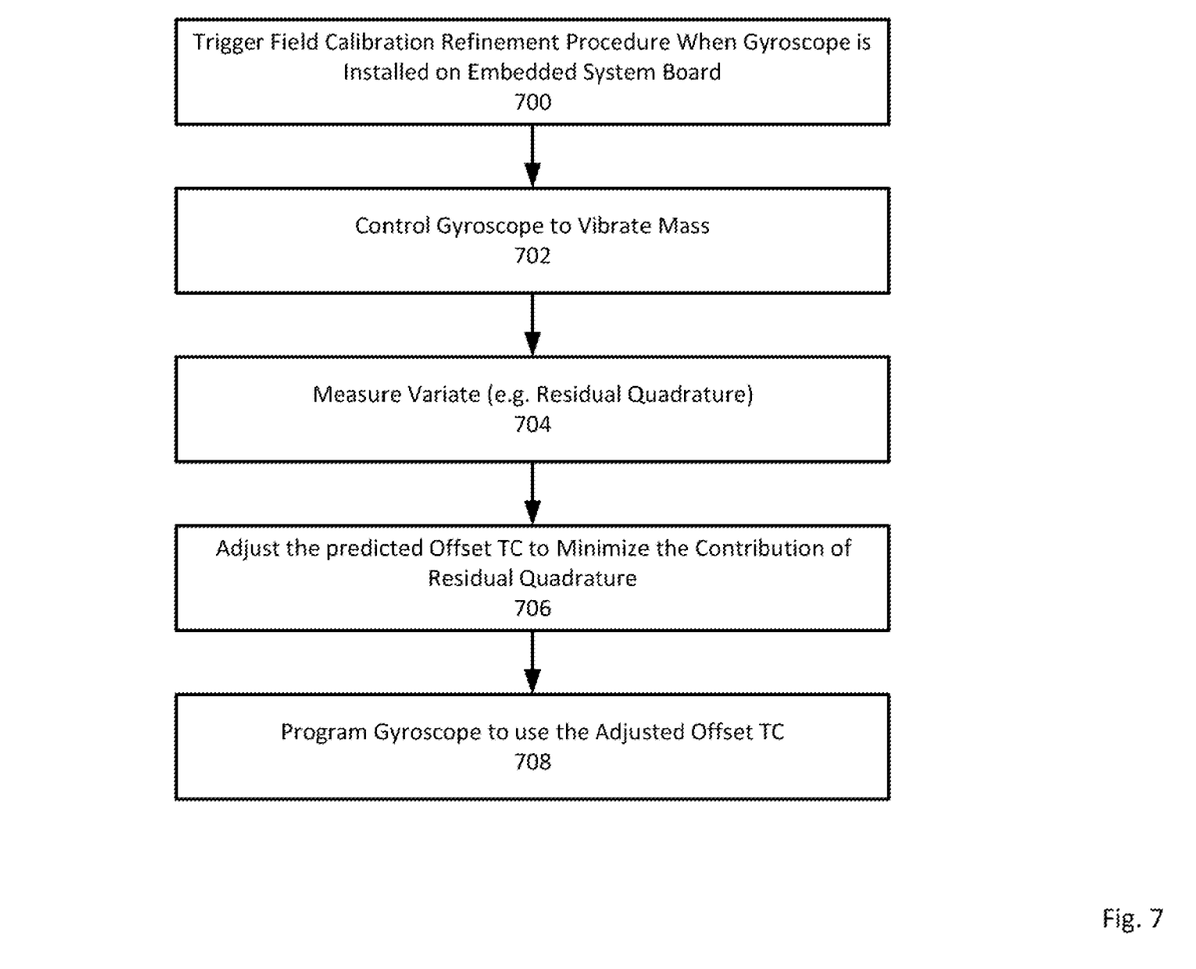
FIG. 7 shows a flowchart for field testing of a MEMS gyroscope, according to an example embodiment of the present disclosure.

Although the chips are tested during the production factory trim phase as described in FIG. 5 for determining an initially accurate predicted offset TC, further testing and modification (e.g. trimming) of the predicted offset TC may be beneficial after the MEMS gyroscope 301 is deployed in the field (e.g. installed/mounted on an embedded system board). FIG. 7 shows a flowchart for field testing of a MEMS gyroscope. This testing may be a refinement test performed by the MEMS gyroscope itself. In step 700, the MEMS gyroscope may trigger itself (e.g. upon initial power up), or be triggered by a command for an end user to perform an predicted offset TC refinement procedure. In step 702, for example, the MEMS gyroscope will vibrate its mass, determine a variate (Residual Quadrature ($Q_{res}$)) that correlates to the predicted offset TC in step 704, adjust the predicted offset TC to eliminate the contribution to Offset TC due to the Residual Quadrature ($Q_{res}$) in step 706, and store the adjusted offset TC in step 708 for future use. This refinement procedure may be performed periodically during the lifetime of the MEMS gyroscope to ensure that the offset TC used by the gyroscope is accurate.

As mentioned above, the oven testing for determining an appropriate offset TC for use in the linear regression will be performed on a subset of a batch of MEMS gyroscopes in order to achieve an accurate estimate for an appropriate offset TC as relative to the ambient values of interest (e.g. Residual Quadrature ($Q_{res}$), Feedthrough Quadrature ($Q_{fl}$), Inphase Offset (IP) and Demodulation phase error ($\phi_{err}$)). Specifically, a predetermined number of randomly selected MEMS gyroscopes from the same batch are selected and tested at the component level and SMT board level to determine the variate values of interest and offset TC needed for compensation. This technique is beneficial because the MEMS gyroscopes in a common batch will likely have similar physical dimensions and therefore exhibit similar bias behavior. Therefore, the ambient measured variates can be input to the linear regression equation or a table populated based on the linear regression equation to predict offset TC that can then be programmed into all of the MEMS gyroscopes in the batch. It is noted that the number of MEMS gyroscopes tested (e.g. size of the subset) may be determined using statistical methods to ensure that an adequate sample is used of a particular batch.

A benefit to using multi-variate linear regression is that an offset TC can be quickly, accurately and affordably determined with minimal use of an oven to heat up the die during subset testing (e.g. the oven is only used for testing a small subset of the gyroscopes to determine offset TC, and then all remaining gyroscopes can be tested at ambient temperature and variates can be input to the linear regression equation to predict offset TC). This process can be performed on a batch-by-batch basis for the MEMS gyroscopes as they are manufactured since all the MEMS gyroscopes in a particular batch will exhibit similar behavior due to similar manufacturing imperfections.

It is noted that although the above steps (steps in FIGS. 5-7) are described as being performed by the manufacturer of the gyroscopes, any entity can perform the described steps. Furthermore, the steps can be performed by different entities (e.g. component level testing and SMT board level testing can be performed by two different entities).

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product define functions of the example embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed example embodiments, are example embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A method for calibrating a micro-electro-mechanical system (MEMS) gyroscopes, the method comprising:
   during a characterization phase:
   a) controlling a first subset of the MEMS gyroscopes to vibrate masses of the first subset of the MEMS gyroscopes;
   b) determining a plurality of variates including quadrature and inphase values from output data of the first subset of the MEMS gyroscopes;
   c) determining offset temperature coefficients to minimize erroneous output data of the first subset of the MEMS gyroscopes over temperature variation;
   d) computing a linear regression using the quadrature and inphase values and the offset temperature coefficients determined for the first subset of the MEMS gyroscopes to determine linear regression variate coefficients for predicting the offset temperature coefficient based on the quadrature and inphase values; and
   during a production factory trim phase:
   e) controlling a second subset of the MEMS gyroscopes to vibrate masses of the second subset of the MEMS gyroscopes;
   f) determining a plurality of variates including quadrature and inphase values from output data of the second subset of the MEMS gyroscopes;
   g) determining a predicted offset temperature coefficient based on the quadrature and inphase values and the linear regression variate coefficients; and
   h) programing the second subset of the MEMS gyroscopes to use the predicted offset temperature coefficient to adjust the output data during operation.

2. The method of claim 1, wherein the variates include at least two of residual quadrature, feedthrough quadrature, inphase offset and demodulation phase error.

3. The method of claim 1, further comprising:
   computing the linear regression by combining the variates into a single variate with a single coefficient.

4. The method of claim 1, further comprising:
   computing the linear regression by maintaining the variates separately with separate coefficients.

5. The method of claim 1, further comprising:
   performing steps (a)-(h) while the MEMS gyroscopes are maintained in a static position.

6. The method of claim 1, further comprising:
   performing steps (a)-(b) of the characterization phase at a chip level before the first subset of MEMS gyroscopes are mounted to a board;
   performing steps (a)-(c) of the characterization phase at a board level after the first subset of MEMS gyroscopes are mounted to the board; and
   performing steps (e)-(h) of the production factory trim phase at the chip level.

7. The method of claim 6, further comprising:
   measuring a residual quadrature signal after the second subset of MEMS gyroscopes are integrated into an embedded system; and
   adjusting the predicted offset temperature coefficient based on the residual quadrature.

8. A system for calibrating micro-electro-mechanical system (MEMS) gyroscopes, the system comprising:
   a processor; and
   a chip testing interface,
   wherein the processor is configured to:
   during a characterization phase:
      a) control a first subset of the MEMS gyroscopes to vibrate masses of the first subset of the MEMS gyroscopes;
      b) determine a plurality of variates including quadrature and inphase values from output data of the first subset of the MEMS gyroscopes;
      c) determine offset temperature coefficients to minimize erroneous output data of the first subset of the MEMS gyroscopes over temperature variation;
      d) compute a linear regression using the quadrature and inphase values and the offset temperature coefficients determined for the first subset of the MEMS gyroscopes to determine linear regression variate coefficients for predicting the offset temperature coefficient based on the quadrature and inphase values; and
   during a production factory trim phase:
      e) control a second subset of the MEMS gyroscopes to vibrate masses of the second subset of the MEMS gyroscopes;
      f) determine a plurality of variates including quadrature and inphase values from output data of the second subset of the MEMS gyroscopes;
      g) determine a predicted offset temperature coefficient based on the quadrature and inphase values and the linear regression variate coefficients; and h) program the second subset of the MEMS gyroscopes to use the predicted offset temperature coefficient to adjust the output data during operation.

9. The system of claim 8, wherein the variates include at least two of residual quadrature, feedthrough quadrature, inphase offset and demodulation phase error.

10. The system of claim 8, wherein the processor is further configured to compute the linear regression by combining the variates into a single variate with a single coefficient.

11. The system of claim 8, wherein the processor is further configured to compute the linear regression by maintaining the variates separately with separate coefficients.

12. The system of claim 8, wherein the processor is further configured to perform steps (a)-(h) while the MEMS gyroscopes are maintained in a static position parallel to ground.

13. The system of claim 8, wherein the processor is further configured to:
perform steps (a)-(b) of the characterization phase at a chip level before the first subset of MEMS gyroscopes are mounted to a board;
perform steps (a)-(c) of the characterization phase at a board level after the first subset of MEMS gyroscopes are mounted to the board; and
perform steps (e)-(h) of the production factory trim phase at the chip level.

14. The system of claim 13, wherein the processor is further configured to:
measure a residual quadrature signal after the second subset of MEMS gyroscopes are integrated into an embedded system; and
adjust the offset temperature coefficient based on the residual quadrature.

15. A calibrated micro-electro-mechanical system (MEMS) gyroscope, comprising:
a mass driven by an electrical drive signal to vibrate;
a detection electrode for detecting inphase and quadrature movement of the mass;
a memory device storing an offset temperature coefficient for minimizing erroneous output data of the MEMS gyroscope, wherein the offset temperature coefficient is predicted by applying linear regression variate coefficients determined from a linear regression to variates including quadrature and inphase values of the output data measured while a plurality of MEMS gyroscopes are driven and are maintained in a static position; and
a circuit that uses the offset temperature coefficient to compensate for a bias in the output data of the MEMS gyroscope during operation.

16. The calibrated MEMS gyroscope of claim 15, wherein after the MEMS gyroscope is integrated into an embedded system, the MEMS gyroscope measures a residual quadrature signal, and adjusts the offset temperature coefficient stored in the memory device based on the residual quadrature signal.

17. The calibrated MEMS gyroscope of claim 16, wherein the MEMS gyroscope is triggered to measure the residual quadrature signal and adjust the offset temperature coefficient stored in the memory device in response to receiving a command from an end user.

18. The calibrated MEMS gyroscope of claim 15, wherein the offset temperature coefficient stored in the memory device is based on the variates including at least two of residual quadrature, feedthrough quadrature, inphase offset and demodulation phase error.

19. The calibrated MEMS gyroscope of claim 15, wherein the offset temperature coefficient stored in a read only portion of the memory device.

20. A method for determining linear regression variate coefficients for determining an offset temperature coefficient for micro-electro-mechanical system (MEMS) gyroscopes, the method comprising:
a) controlling a plurality of MEMS gyroscopes from a batch of MEMS gyroscopes to vibrate respective masses;
b) determining a plurality of variates including quadrature and inphase values from an output data of each of the plurality of MEMS gyroscopes;
c) determining offset temperature coefficients of each of the MEMS gyroscopes;
d) computing a multi-variate linear regression using the quadrature and inphase values and the offset temperature coefficients determined for the MEMS gyroscopes to determine the linear regression variate coefficients for predicting the offset temperature coefficient based on the quadrature and inphase values; and
e) programing all the MEMS gyroscopes in the batch to use a respective predicted offset temperature coefficient in order to adjust the output data of the MEMS gyroscopes during operation, the respective predicted offset temperature coefficient being determined by applying the linear regression variate coefficients from the linear regression to the respective variates of each of the MEMS gyroscopes.

* * * * *